April 7, 1931.  J. HOLAN  1,799,233
VEHICLE
Filed Nov. 23, 1925  3 Sheets-Sheet 1
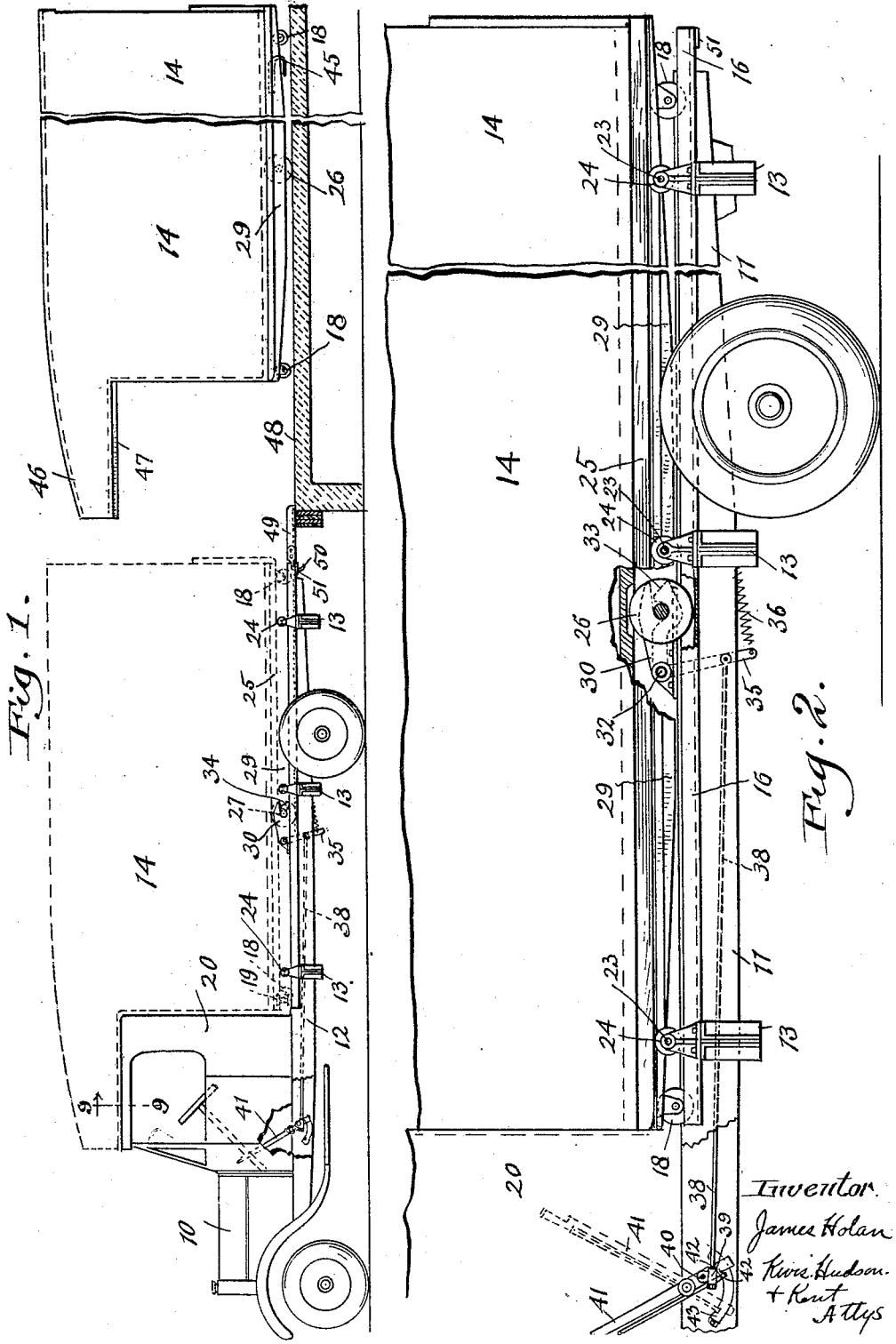

April 7, 1931. J. HOLAN 1,799,233
VEHICLE
Filed Nov. 23, 1925 3 Sheets-Sheet 2
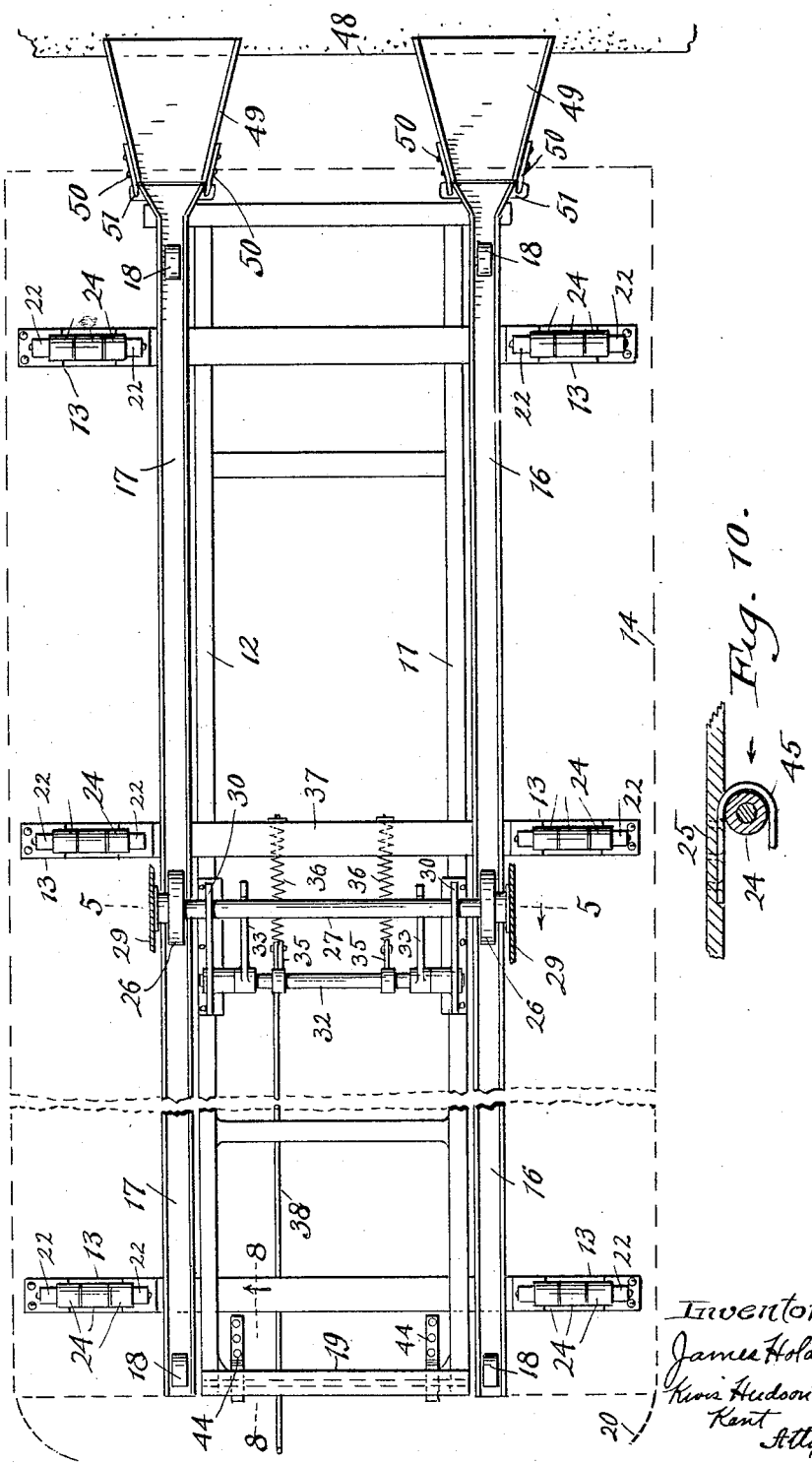

April 7, 1931.  J. HOLAN  1,799,233
VEHICLE
Filed Nov. 23, 1925   3 Sheets-Sheet 3

Inventor
James Holan
Kwis Hudson & Kent
Attys

Patented Apr. 7, 1931

1,799,233

UNITED STATES PATENT OFFICE

JAMES HOLAN, OF CLEVELAND, OHIO

VEHICLE

Application filed November 23, 1925. Serial No. 70,758.

This invention relates to vehicles and more especially to vehicles equipped with interchangeable bodies so that the vehicle, with one of the bodies thereon, may be engaged in delivery service while another body is being loaded. Such vehicles are especially adapted for commercial use by department stores, warehouses and other mercantile establishments for the delivery of goods and permit the motor unit to be in practically continuous service, thereby avoiding the delays incident to loading and unloading motor trucks that are equipped with permanent bodies.

It is one of the objects of the invention to provide a convenient and comparatively simple means by which the removable body may be run onto and off of the frame of the motor unit and when in its normal position thereon is securely attached to the frame so that the body will be held against shifting on the frame regardless of the jolting to which the vehicle is subjected in travelling over bad roads.

A further object of the invention is to provide means permitting the vehicle bodies to be quickly interchanged and conveniently moved about on a platform or floor, when removed from the motor unit.

Other objects of the invention and the features of novelty will be apparent from the following description taken in connection with the accompanying drawings, of which:

Fig. 1 is a side elevation of a vehicle embodying my invention, the same being shown in connection with a loading platform and illustrating the manner of interchanging the bodies;

Fig. 2 is an enlargement of a portion of Fig. 1;

Fig. 3 is a plan view of the vehicle frame with the body-wheels and casters shown in the position they occupy when the body is on the frame;

Fig. 10 is a detail section on the line 10—10 of Fig. 5.

Figure 4:
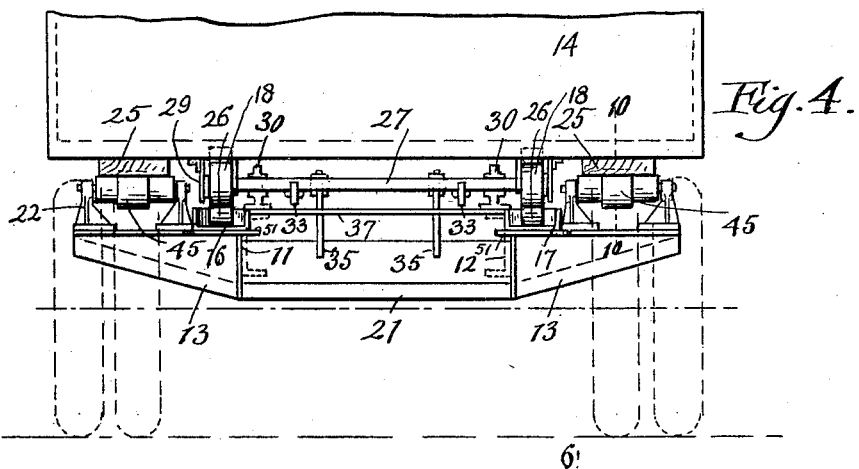
Fig. 4 is an elevation of the rear end of the vehicle.
Figure 5:
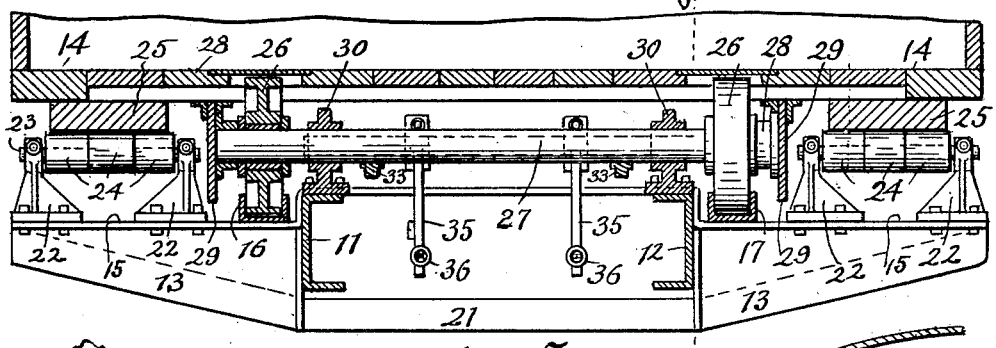
Fig. 5 is an enlarged section on the line 5—5 of Fig. 3.
Figures 6, 8, 9:
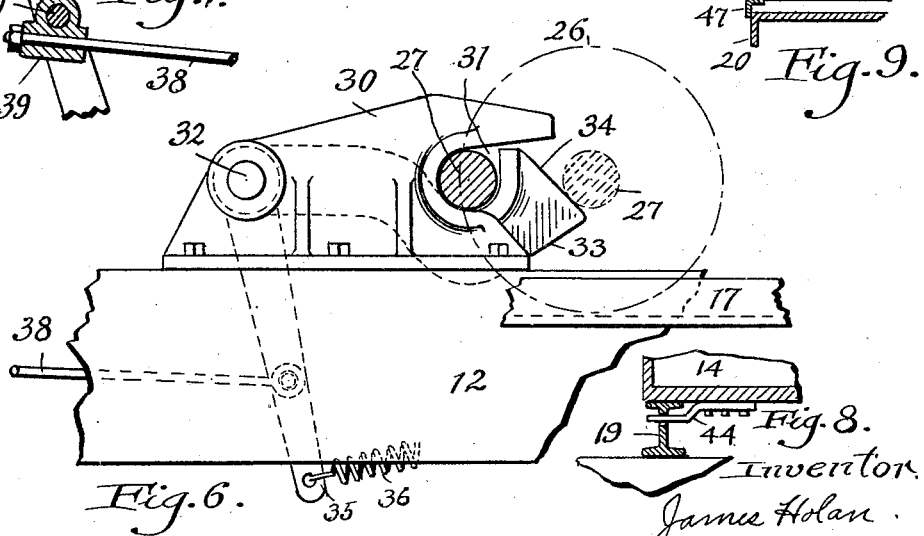
Fig. 6 is an enlarged section on the line 6—6 of Fig. 5.
Fig. 8 is a detail section on the line 8—8 of Fig. 3.
Fig. 9 is a detail section on the line 9—9 of Fig. 1.

Referring to the drawings, 10 indicates the chassis of a motor vehicle having the side frame members 11 and 12 to the outer sides of which the brackets 13 are attached. In the drawings, I have illustrated six of the brackets 13, two of which are under the forward portion of the body 14, two under the rear portion and two adjacent the middle of the body. As shown most clearly in Fig. 5, the upper surfaces 15, of the brackets 13, are arranged below the upper surfaces of the side members 11 and 12 so as to permit the body 14 to be close to the vehicle frame and thereby lower the center of gravity as much as possible. Two channel-shaped trackways 16 and 17 are arranged on the brackets 13, along the outer sides of the frame members 11 and 12 and, two pairs of swiveling casters 18 are arranged on the underside of the body 14, adjacent the ends thereof, these casters being properly spaced to run in the trackways 16 and 17. A cross-beam 19 is supported on the frame members 11 and 12 just to the rear of the operator's cab 20. Each pair of the brackets 13 is reinforced by a transverse strut 21 so that these brackets are thereby made strong enough to support the load of the body. Each of the brackets 13 carries a pair of supports 22 for a shaft 23, which carries rollers 24, and the underside of the body has secured thereto runners 25 adapted to engage the rollers 24, when the body is in its normal position on the vehicle frame, to thereby support the body independently of the casters 18 and the wheels 26, on which the body is carried in being moved about. The wheels 26 are rotatable on a cross-shaft 27 which is mounted, at its ends, in bearings 28 that are secured to the sides of the girders 29, these girders being secured to the underside of the body and serving to reinforce the latter. The wheels 26 extend below the casters 18 so that the body is adapted to be balanced on the wheels 26 to permit it to be readily moved about, when off the vehicle. Secured to the upper sides of the frame members 11 and 12 are the stationary brackets 30 which have pockets 31 at their rearward ends to receive the shaft 27, as shown in Fig. 6. A shaft 32 is rotatably supported in the brackets 30 and carries arms 33, the outer ends of which are in the form of hooks, adapted to engage with the shaft 27, for the purpose of locking this shaft in the pockets 31. The arms 33 have inclined or cam surfaces 34 which are engaged by the shaft 27, as the body is moved onto the vehicle frame, thereby depressing the arms and permitting the shaft to enter the pockets 31. The shaft 32 is also provided with arms 35, which are secured thereon, and springs 36 have one end attached to the arms 35 and the other end attached to a cross-member 37, of the vehicle frame, and tend to rotate the shaft 32 in the counter-clockwise direction and thus normally hold the arms 33 in the position shown in Fig. 6 thereby locking the body to the vehicle frame. An actuating rod 38 has one end pivotally connected with one of the arms 35 and its forward end slidable in a sleeve 39 that is mounted on a pivot 40 on the lever 41. The lever 41 is substantially the same as the ordinary emergency brake lever commonly used on automobiles and has a latch 42 which cooperates with a quadrant 43 to hold the lever in its different positions.

Two arms 44 are secured to the underside of the body, adjacent the forward end thereof, and these arms extend through openings in the cross-beam 19, for the purpose of holding down the forward end of the body (see Figs. 3 and 8). In a similar manner, two arms 45 are secured to the runners 25 so as to engage under the rear pair of rollers 24, when the body is in its normal position on the vehicle frame, to hold down the rear corners of the body.

Figure 7:
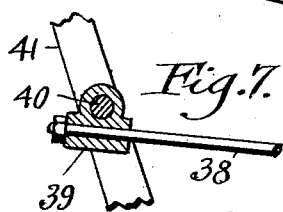
Fig. 7 is a fragmentary detail view of the control lever for releasing the locking device.

From Fig. 1, it will be noted that the body 14 has a projection 46 at its forward end, which extends over the cab 20 and this projection not only has the advantage of providing additional storage space within the body but also forms, with the cab 20, a finished appearance which gives to the whole structure an appearance similar to that of a vehicle having a permanent body thereon. This finished appearance is enhanced by securing to the lower edge of the projection 46, a rubber strip 47 which overlaps the upper edge of the cab 20 and conceals the joint between these parts. The strip 47 also serves to keep water and snow out of the space between the projection 46 and the roof of the cab 20. When it is desired to remove the body from the vehicle, the operator actuates the lever 41 to lower the arms 33, thereby permitting the body to be pushed rearwardly. In order to permit the body to be run onto a platform 48, (see Fig. 1) the extensions 49 may be provided at the ends of the trackways 16 and 17, these extensions having hooks 50 on their opposite sides which are adapted to engage with eyes in the bars 51, at the ends of the trackways. When the body is placed on the vehicle frame, the shaft 27 automatically depresses the arms 33, by engagement with the cam surfaces 34, and when the body reaches its normal position, the arms 33 are restored to the position shown in Fig. 6 by the springs 36. When the arms 33 are depressed, the rod 38 slides through the sleeve 39, as will be clearly understood from Fig. 7. It is believed that the foregoing will make the operation of all of the features of the invention clear without further description.

Having thus described my invention, what I claim is:

1. In vehicles, the combination of a frame having a plurality of outwardly projecting body-supporting brackets on the sides of said frame, trackways carried by said brackets, a removable body having a transverse shaft on its underside provided with wheels arranged to run in said trackways, rollers on said brackets for supporting the body and a jaw member on said frame adapted to engage said shaft.

2. In vehicles, the combination of a frame, a removable body having a transverse shaft on its underside provided with wheels, and relatively movable members on said frame for engaging said shaft and locking the body against longitudinal movement on said frame.

3. In vehicles, the combination of a frame, a removable body having a transverse shaft on its underside provided with wheels, jaw members on said frame adapted to receive said shaft and limit the movement of the body in one direction, and automatically operating latching means engaging said shaft when the shaft is in said jaws and serving to hold the body against movement in the opposite direction.

4. In vehicles, the combination of a frame having a cab thereon, said frame also having trackways thereon, a removable body having a shaft on the underside with wheels to run on said trackways, brackets on said frame adapted to engage said shaft, a latch pivotally mounted on said frame and engageable with said shaft to cooperate with said brackets to hold said body against movement in either direction longitudinally of said frame, and means operable from within said cab to control said latch.

5. In vehicles, the combination of a frame having a cab thereon, said frame also having trackways thereon, a removable body having wheels adapted to run on said trackways, brackets on said frame, means on the underside of said body for supporting said wheels and adapted to be engaged by said brackets to hold the body against movement in one direction, a latch mechanism on said frame engageable with said means to hold the body against movement in the opposite direction, and control means for said latch mechanism operable from within said cab.

In testimony whereof, I hereunto affix my signature.

JAMES HOLAN.